United States Patent [19]
Ueki

[11] Patent Number: 5,325,208
[45] Date of Patent: Jun. 28, 1994

[54] IMAGE FORMATION DEVICE FOR SCANNING AN OPTICAL MEMORY BY INTERMITTENTLY IRRADIATING A NIGHT BEAM IN ACCORDANCE WITH DENSITY OF A PIXEL

[75] Inventor: Yoshiharu Ueki, Nara, Japan

[73] Assignee: Sharp Kabushiki Kaisha, Osaka, Japan

[21] Appl. No.: 882,075

[22] Filed: May 12, 1992

[30] Foreign Application Priority Data

May 16, 1991 [JP] Japan ................... 3-111901

[51] Int. Cl.$^5$ ............................... H04N 1/00
[52] U.S. Cl. ..................... 358/401; 358/404; 358/444; 358/413; 358/409; 358/296; 358/412; 346/107 R
[58] Field of Search ............... 358/409, 401, 444, 404, 358/474, 484, 296, 298, 412, 413; 346/108, 107 R; 359/45, 90

[56] References Cited

U.S. PATENT DOCUMENTS

| | | | |
|---|---|---|---|
| 3,796,999 | 3/1974 | Kahn | 346/76 |
| 4,605,972 | 8/1986 | Hatanaka | 358/296 |
| 4,842,976 | 6/1989 | Sanders et al. | 430/138 |
| 5,103,316 | 4/1992 | Ogura | 346/107 R |
| 5,140,448 | 8/1992 | Bone et al. | 359/90 |
| 5,187,495 | 2/1993 | Tanimoto et al. | 346/108 |

FOREIGN PATENT DOCUMENTS

| | | | |
|---|---|---|---|
| 0291300 | 11/1988 | European Pat. Off. | |
| 59-30537 | 2/1984 | Japan | |
| 64-20773 | 1/1989 | Japan | |
| 4034407 | 2/1992 | Japan | 346/108 |

Primary Examiner—Stephen Brinich
Assistant Examiner—Fan Lee
Attorney, Agent, or Firm—David G. Conlin; Robert F. O'Connell

[57] ABSTRACT

An image formation device in which an image according to image data received from an image data output device is selectively written by light beam in an optical image memory and the image is printed out on a recording medium, includes a light source for emitting light beam, a scanning device for scanning a surface of the optical image memory with the light beam, a switch for turning on or off the light beam, a sensing device for sensing from the image data a beam irradiating period T per a single pixel corresponding to a density of the pixel, and a controller for controlling the switch so that the light beam intermittently performs T/n period irradiation n times during a scanning period per a single pixel.

4 Claims, 7 Drawing Sheets

IMAGE FORMATION DEVICE FOR SCANNING AN OPTICAL MEMORY BY INTERMITTENTLY IRRADIATING A NIGHT BEAM IN ACCORDANCE WITH DENSITY OF A PIXEL

BACKGROUND OF THE INVENTION

1. Field of the Invention

The present invention relates to an image formation device in which beam light is employed to store an image data in an optical image memory, and the image stored therein is read and printed out.

2. Description of the Related Art

U.S. Pat. No. 3,796,999 discloses a display in which laser light selectively irradiates a liquid crystal cell to display an image on liquid crystal array. According to the invention disclosed therein, head of the laser light is utilized to partially change a phase of the liquid crystal, and an image can be formed depending upon an irradiation pattern of the laser light. The liquid crystal cell employed is, for example, a smectic liquid crystal.

Japanese Unexamined Patent Publication SHO/64-20773 discloses a device in which a thermal writing liquid crystal cell device is employed to form an image. According to the invention disclosed therein, transmitting light through a liquid crystal cell layer or reflecting light therefrom irradiates photosensitive material to make a latent image on the photosensitive material, and an image can be formed based upon the latent image. There are provided three kinds of liquid crystal cells where respective images of primary colors, red (R), green (G) and blue (B), are to be written, and a full color image is composed of the three types of images.

In such a conventional image formation device, formation of a variable density image on a liquid crystal cell can be implemented by varying energy of laser beam used for writing in accordance with density information of image data. A method of varying an irradiation energy of laser beam includes a amplitude modulating method in which an intensity of emission of laser beam is varied and a pulse width modulating method in which a period for which light is emitted is varied while the intensity of emission of laser beam is fixed, and because of simplicity and accuracy of control, usually the pulse width modulating method is employed. In this method, a gradation control of each pixel is implemented by varying on-time of laser within a range of a period of a pixel cycle in accordance with the density information of image data.

However, the on-time of the laser within the range of a period of a pixel cycle is continuous, and hence, there arises an unevenness in a distribution of applied energy within a single pixel, and a good reproduction of gradation cannot be obtained.

Accordingly, it is an object of the present invention to provide an image formation device in which a gradation reproducibility is enhanced by leveling the dispersion of the laser energy directed to a single pixel.

SUMMARY OF THE INVENTION

The present invention provides an image formation device in which an image according to image data received from image data output means is selectively written by light beam in an optical image memory and the image is printed out on a recording medium, comprising a light source for emitting light beam, scanning means for scanning a surface of the optical image memory with the light beam, switch means for turning on or off the light beam, sensing means for sensing from the image data a beam irradiating period T per a single pixel corresponding to a density of the pixel, and control means for controlling the switch means so that the light beam intermittently performs T/n period irradiation n times during a scanning period per a single pixel.

Preferably, the image formation device further comprises detecting means for outputting a signal each time the light beam scans only 1/n of a scanning section per a single pixel, and the control means controls the switch means so that the light beam irradiates the optical image memory for the period T/n each time the detecting means output a signal.

Further preferably, the scanning means is driven by a motor, and the detecting means is a rotary encoder which is coupled with the motor.

Still preferably, the light source is a laser diode, and the optical image memory is a liquid crystal cell.

DETAILED DESCRIPTION OF THE PREFERRED EMBODIMENT

Figure 1:
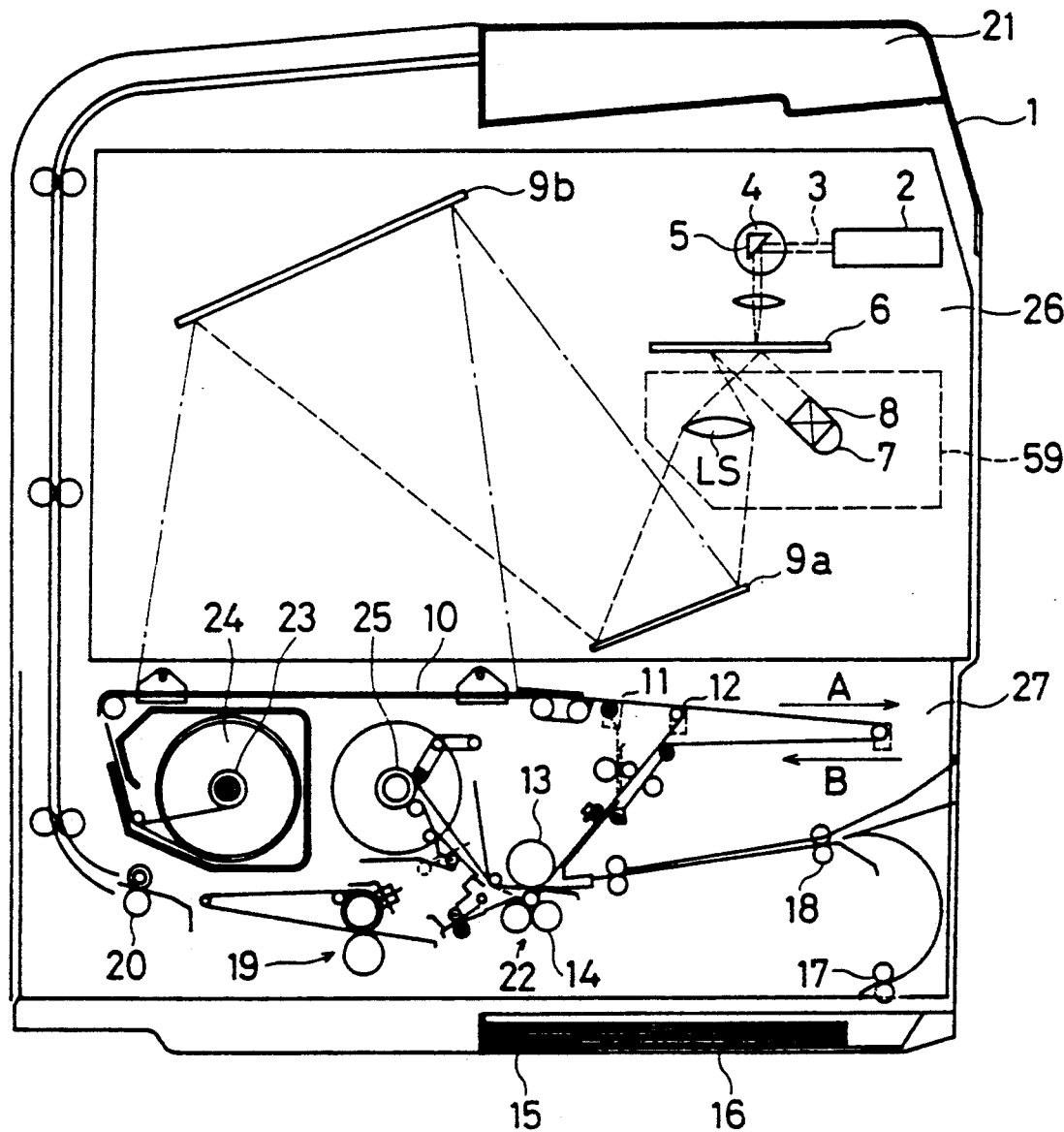
FIG. 1 is a diagram showing a structure of an embodiment according to the present invention.

FIG. 1 is a schematic diagram showing a structure of an image formation device (printer) of an embodiment according to the present invention. In this image formation device, usually incorporated are a photosensitive sheet (media sheet) and an image receiving sheet; the former is coated with microcapsules containing photo curing material and image forming agent, and the latter is coated with thermo-plastic resin forming a developing material which reacts with the image forming agent to develop colors.

The image formation device can be generally sectioned into two, upper and lower units. The upper unit comprises an image writing means and exposing unit 26, which has, as viewed in upper right, a laser diode 3 emitting laser beam 3, a rotary encoder motor 4, a primary scanning mirror 5, a liquid crystal cell unit 6, an exposing optical system 59 and a mirror 9a. The exposing optical system 59 includes an exposing lamp 7, a color filter unit 8 and a lens LS. Also, the exposing unit 26 has a mirror 9b, as viewed in upper left. The other half, namely, the lower unit, is a developing unit 27, as viewed in the left, a media sheet 24 wound on a supply shaft 23, and this sheet is provided with a path up to a take-up shaft 25. That is, along the media sheet 24 path starting from the supply shaft 23, an exposing panel 10, an automatic carrier roller 11, a buffer roller 12 and pressing rollers 13 and 14 are installed in position. As viewed in the lower right of this unit, a cassette 15 is attached, and the cassette 15 holds a mass of image receiving sheets 16. On a path between the cassette 15 and a pressure developing unit 22 along which the image receiving sheets are carried, a supply roller 17 and a timing roller 18 are disposed. A lustering apparatus 19 is positioned in the left of the pressure developing unit 22, and furthermore, in the left of the lustering apparatus 19, in turn, a sheet discharger roller 20 is arranged. A cabinet 1 has a sheet discharging unit 21 in its top.

Figure 2:
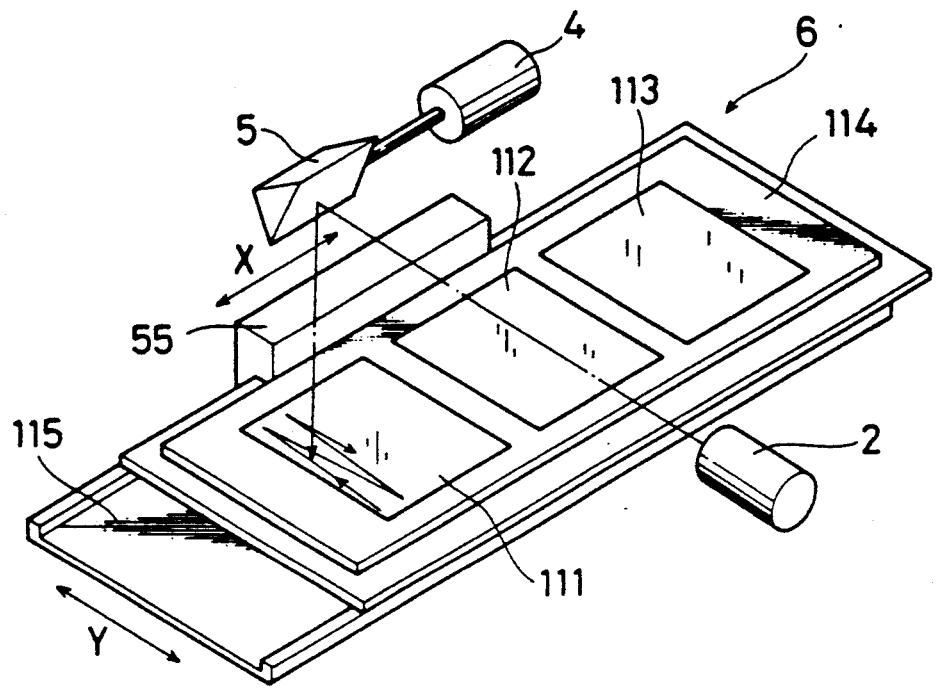
FIG. 2 is a diagram showing a major portion of the embodiment shown in FIG. 1.
Figure 3:
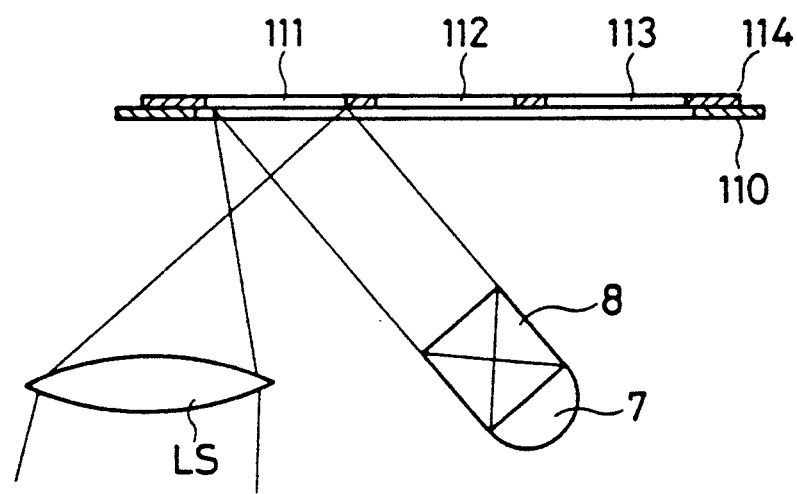
FIG. 3 is a diagram showing a control unit of the embodiment shown in FIG. 1.

FIGS. 2 and 3 show detailed structures of major portions included in FIG. 1. Referring to FIGS. 2 and 3, the liquid crystal cell unit 6 includes three liquid crystal cell arrays 111, 112 and 113, which are all fixed in a frame 114 and supported by a liquid crystal supporting unit 110. The liquid crystal supporting unit 11 can be moved in an X-axis direction (in a secondary scanning direction), and a linear encoder motor (a linear motor coupled with a linear encoder) 55 controls to move it accurately. A writing apparatus including the laser diode 2, primary scanning mirror 5 and rotary encoder motor (motor coupled with a rotary encoder) 4 is arranged above the liquid crystal supporting unit 110. In writing an image, reciprocally pivoting the mirror 5 while the supporting unit 110 is moved in the X-axis direction, laser beam scans the liquid crystal cell 111 in the Y-axis direction (primary scanning direction) as shown by arrow in FIG. 2 to perform image writing.

The color filter unit 8 in the exposing optical system 59 has a color separating filter and a shutter (both of them are not shown). Each time the liquid crystal supporting unit 110 moves in the X-axis direction (FIG. 2) until the liquid crystal cells reach their respective specified positions, the shutter of the color filter unit 8 opens to scan a plane surface of each of the liquid crystal cells, and reflected light from the surface is directed to travel through the lens LS towards the exposing panel 10 and irradiate the media sheet 24 to image the contents thereof. The liquid crystal cells 111 to 113 are for red (R), green (G) and blue (B) images, respectively. The color separating filter in the color filter unit 8 is meant to selectively transmit light of specified colors, and specifically, it includes three sorts of filters: an R filter which transmits wavelength of red, a G filter which transmits wavelength of green, and a B filter which transmits wavelength of blue. The filter is switched with the R filter for transmitting wavelength of red in reading a liquid crystal cell where a red (R) image is stored, switched with the G filter for transmitting wavelength of green in reading a liquid crystal cell where a green (G) image is stored, or switched with the B filter for transmitting wavelength of blue in reading a liquid crystal cell where a blue (B) image is stored. The R, G and B filters are attached to a turn disk (not shown) which is driven by a motor, slits cut in the turn disk allows a specified one of the R, G and B filters to be positioned on an axis of light emitted by the lamp 7. The shutter of the color filter unit 8 is also formed with a turn disk (not shown) with an aperture which is driven by a motor, and slits cut in the turn disk are utilized to detect open or close of the shutter.

When light of red, green or blue which is reflected from the liquid crystal cell unit 6 is directed to travel through the lens LS, and the mirrors 9a and 9b to the media sheet 24 on the exposing panel 10 to image on the media sheet 24, the buffer roller 12 moves in a direction of arrow A. As a result of the operation so far, the media sheet 24 is provided with an image thereon by selective hardening. The media sheet 24 may be, for example, overlaid with a photosensitive and pressure sensitive sheet which can accommodate full color as disclosed in Japanese Unexamined Patent Publication SHO/59-30537, which is coated on its surface uniformly and scatteringly with three sorts of microcapsules: ① microcapsules containing light hardening material which is sensitive to red light and image forming agent which develops cyanogen, ② microcapsules containing light hardening material which is sensitive to green light and image forming agent which develops magenta, and ③ microcapsules containing light hardening material which is sensitive to blue light, and image forming agent which develops yellow.

After the media sheet 24 is exposed to light, the take-up shaft 25 is revolved and the buffer roller 12 is moved in a direction of arrow B, so that the media sheet 24 which has an image formed by selective hardening is sent to the pressure developing unit 22. On the other hand, the image receiving sheets 16 which are supplied one by one from the cassette 15 are carried by the supply roller 17 and stop at the timing roller 18 to stand by there. After the buffer roller 12 start to move in the direction of arrow B, the one of the image receiving sheets 16 which has stood by is sent to the pressure developing unit 22 at such a timing as to adjust the image on the media sheet 24. The media sheet 24 and the one of the image receiving sheet 16 laid thereon are sent between the pressing rollers 13 and 14 and pressed. This causes the microcapsules which are not hardened on the media sheet 24 to be broken and the image forming agent to flow out, and the developing material on the image receiving sheet makes a reaction to the image forming agent to develop color. The media sheet 24 which has thus passed through pressure development is taken up by the take-up shaft 25, while the one of the image receiving sheets 16 is subjected to a thermal treatment in the lustering apparatus 19, sent upwards by the discharger roller 20, and then, discharged into the sheet discharging unit 21.

Figure 4:
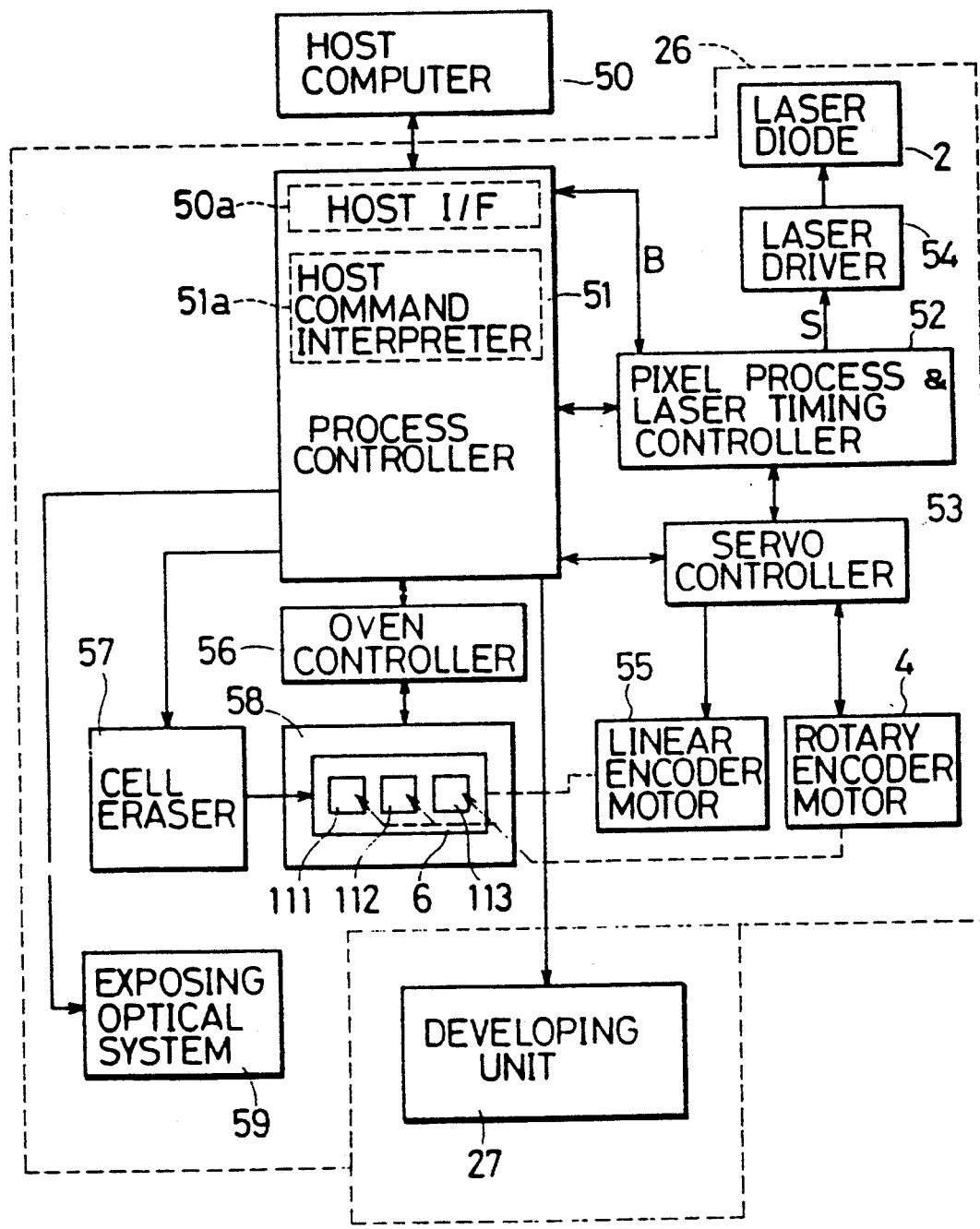
FIG. 4 is a block diagram showing the control unit of the embodiment shown in FIG. 1.

FIG. 4 is a block diagram showing a control circuit of the image writing and exposing unit 26, and a control operation in this embodiment will be described with reference to FIG. 4.

First, a command transmitted previous to actual image data is analyzed in a command interpreter in a process controller 51, and thereafter, in accordance with results of the analysis, the image data transferred from a host computer 50 through a host interface 50a are transferred through an inner pixel bus B to a pixel process and laser timing controller 52, which performs processing image data and adjusting a laser-on timing. In processing image data, original image data transferred from the host computer 50 is corrected in order to enhance color reproducibility, gradation and other qualities of an image. An algorithm for correction is determined so as to gain better quality of an image, allowing for an influence exerted upon quality of reproduced images by the media sheet 24 employed, the developing unit 27 and the image writing and exposing unit 26. In adjusting a laser-on timing, taking a timing with a servo controller 53 mentioned later, a laser drive signal S is produced at a suitable timing to a laser driver 54 and at a laser-on timing corresponding to image data to make the laser diode emit light. Laser beam emitted by the laser diode 2 is reflected by the primary scanning mirror 5 which is attached to a shaft of the rotary encoder motor 4 and irradiates a surface of the liquid crystal cell 6. Through a combination scanning of a laser beam scanning in the primary scanning direction by the linear encoder motor with a scanning in the secondary scanning direction by the linear encoder motor 55, an image is written in the cells 111 to 113 on the liquid crystal cell unit 6. A rotary encoder built in the rotary encoder motor 4 and a linear encoder built in the linear encoder motor 55 monitor a position of each encoder motor, and in accordance with position information obtained in this way, the servo controller 53 performs a required drive control for image writing. The position information received from each of the encoders (i.e., rotary and linear encoders) is also transmitted to the pixel process and laser timing controller 52 and utilized to control on-timing of the laser diode 2.

Information on images written on the liquid crystal cells 111 to 113 is read out by the exposing optical system 59, and light containing the information on the images is directed to the media sheet 24; that is, the exposing optical system 59 receives a signal from the process controller 51 to direct light from the exposing lamp 7 through the color filter unit 8 to the surface of the liquid crystal cell unit 6, and it further leads light reflected by the liquid crystal cell unit 6 through the lens LS to the media sheet 24.

Figure 5:
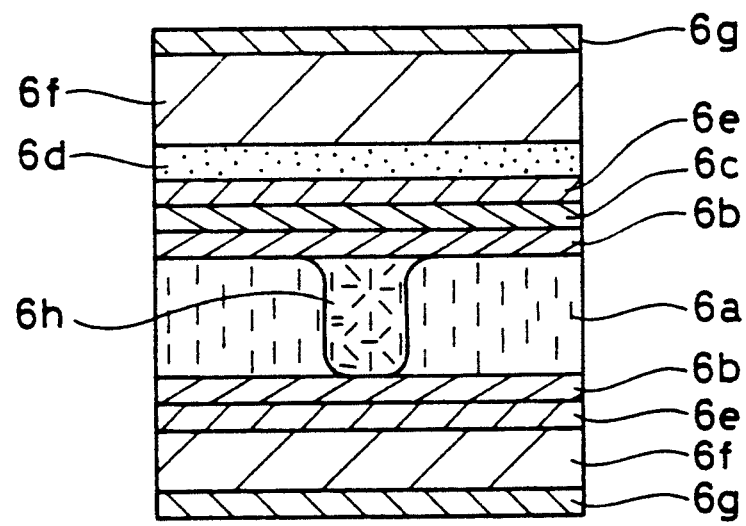
FIG. 5 is a diagram showing a structure of a major portion of a liquid crystal cell.

Each of the liquid crystal cells employed in this embodiment, as shown in FIG. 5 in its cross-section, is a laser heat writing and reflection type cell. A liquid crystal cell utilized in a laser heat writing method is especially called "liquid crystal light bulb", where a transparent electrode 6e is formed along the entire inner surfaces of two glass substrates 6f by which a smectic liquid crystal layer 6a is sandwiched. One of the substrates is formed with a laser beam absorbing layer 6d. When laser beam is converged into a spot of approximately 10 microns diameter on the liquid crystal cell, the absorbing layer 6d absorbs laser beam and generates heat, and when the heat is conducted to the liquid crystal layer 6a, only a part 6h which is irradiated with the laser beam changes from a smectic (S) phase through a nematic (N) phase into an isotropic liquid (I) phase. Temperature of liquid crystal falls quickly when the laser beam is directed to any other spot, and in the course where the part 6h recovers from the I phase, to the N phase and further to the S phase, an orientation texture of light scattering property is constructed. The liquid crystal cell is in smectic phase at an operating temperature of the liquid crystal layer 6a, and it is set in an oven 58 under temperature control at about 51° C. by an oven controller 56 so that energy of laser beam irradiating the liquid crystal cell can cause a phase transition of an isotropic body. Liquid crystal in the remaining part which is irradiated with no laser beam has a transparent orientation texture, and the orientation texture of light scattering property, once formed, stably coexists with the transparent orientation texture. Thus, pixels of light scattering property are written in the liquid crystal layer by irradiation of laser beam, and moreover, an image with a gradation can be written by scanning a surface of the liquid crystal cell with an intensity modulation of laser beam (modulation of pulse width in units of a single pixel). When light is directed from a reverse side of the liquid crystal cell which has an image on its right side, a part which was not irradiated with the laser beam in the liquid crystal layer 6a transmits the light, and a light reflecting layer 6c makes a mirror reflection to return the light. However, the part 6h scatters the light. In this way, the liquid crystal cell unit 6 reflects light of a variable density image. It is necessary to change all the orientation into a transparent one to erase an image which is once written in the liquid crystal cell. The image is erased as follows: An orientation texture of light scattering property which is written through temperature variations caused by irradiating the liquid crystal cell with laser beam is canceled by applying a high electric field of a specific threshold value or over, and then, it recovers an initial transparent state. In such a procedure, thorough erasing of an image of light scattering property on the liquid crystal cell can be erased. In this embodiment, a cell eraser 57 is used to apply square wave voltage of about ±200 V to opposite terminals of the transparent electrode 6e so that a high electric field can be developed in the liquid crystal layer, and thus, the image can be completely erased.

Figure 6:
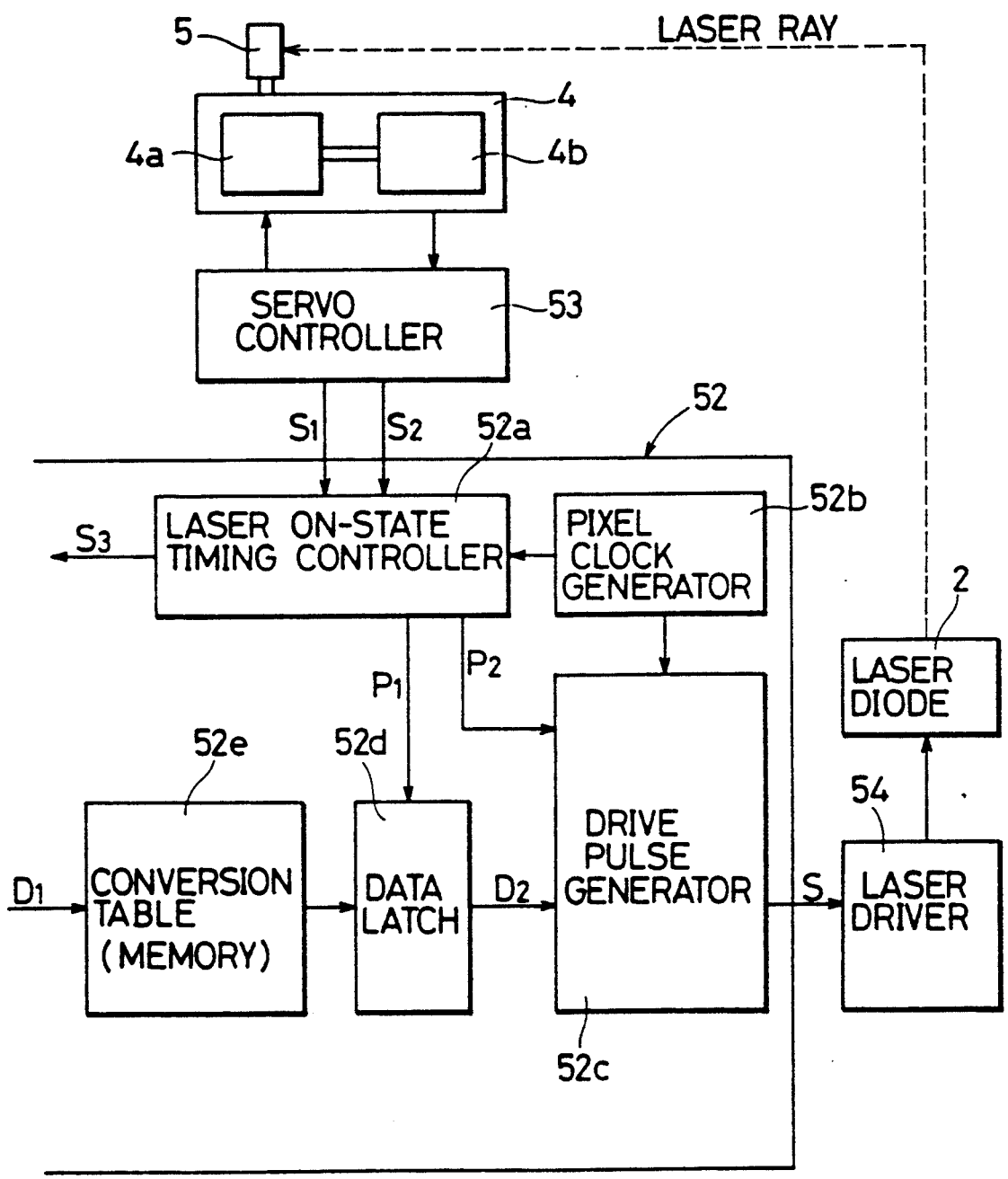
FIG. 6 is a diagram showing a major portion of FIG. 4 in detail.
Figure 7:
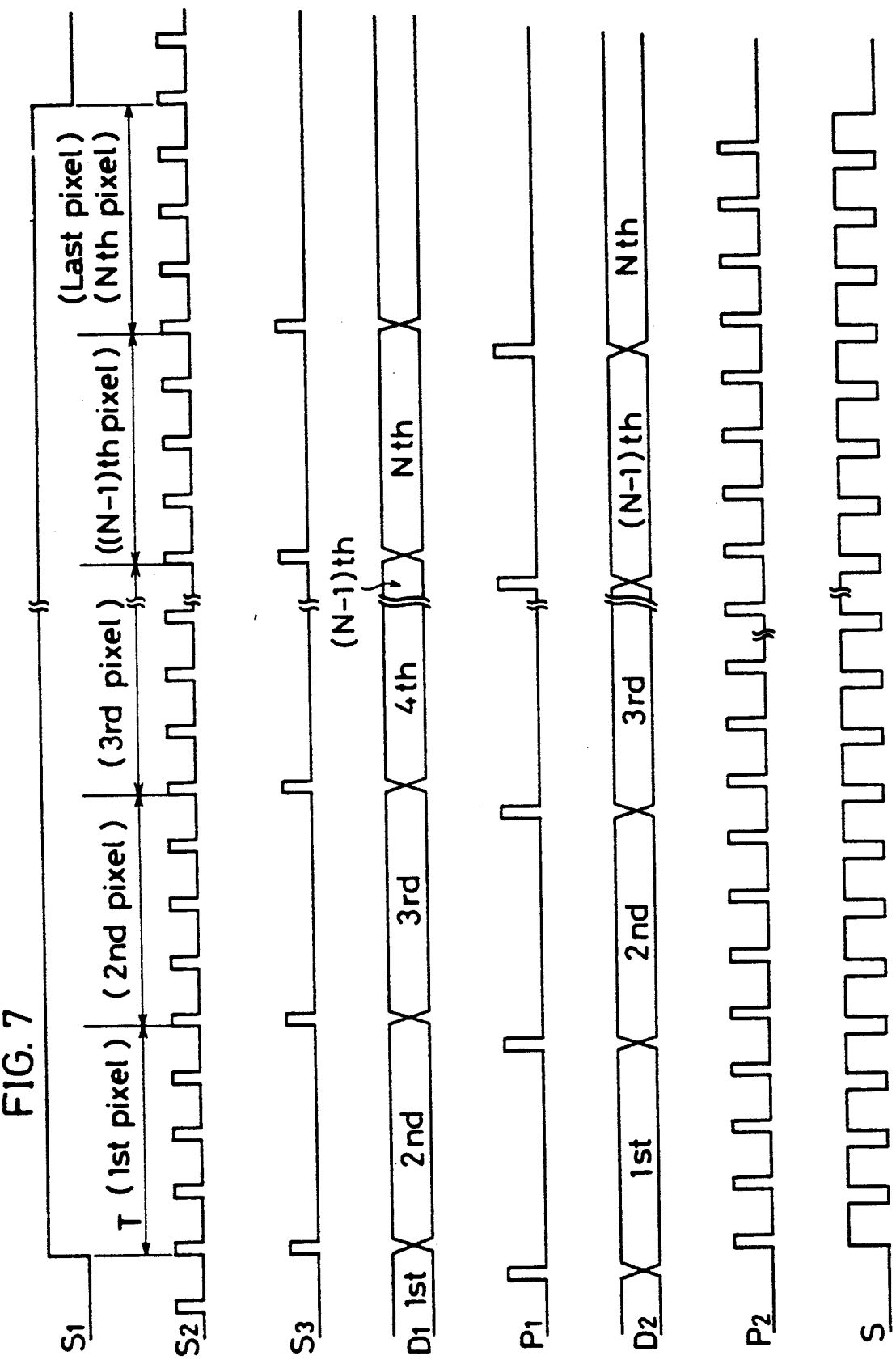
FIG. 7 is a timing chart showing an operation of a major portion of the embodiment according to the present invention.

FIG. 6 is a diagram showing a major portion of FIG. 4 in detail while FIG. 7 is a timing chart for explaining signals in FIG. 6. Referring to FIGS. 6 and 7, the primary scanning mirror 5 attached to an axis of a motor 4a of the rotary encoder motor 4 utilizes its reciprocal vibration to make laser beam scan in the primary scanning direction, and thus, an image is formed on the liquid crystal cell. At this time, a position of the laser beam on the liquid crystal cell is always sensed a rotary encoder 4b of which axis is aligned to a rotation axis of the primary scanning mirror, namely a rotation axis of the motor 4a. The servo controller 53 controls a rotation of the motor 4a in accordance with position information from the rotary encoder 4b, and this operation is performed so that a rotation disposition after a certain period of time from a start of rotation of the motor 4a, namely, a scanning position of the laser beam on the liquid crystal cell, precisely follow a scanning position related to a time axis which is programmed in advance. Usually, the laser beam is controlled so as to scan at constant velocity. Laser beam starts scanning from a scanning terminal, and when it reaches an effective image region on the liquid crystal cell, a GATE signal S1 is made effective. The GATE signal S1 stays effective while the laser beam is scanning within the effective image region on the liquid crystal cell. The servo controller 53 also uses the rotary encoder 4b to sense a scanning position of laser beam at a resolution capability of 1/n of a single pixel, where n=4 for convenience of the description hereinafter. a value n=4 set fourth herein is not particularly decisive but adequately selected depending upon a pixel density or a structure of a gradation control circuit. While the laser beam is scanning, a PPS signal (Pixel Partition Signal) S2 which indicates a scanning position at each interval of ¼ of a single pixel is output.

Figure 8:
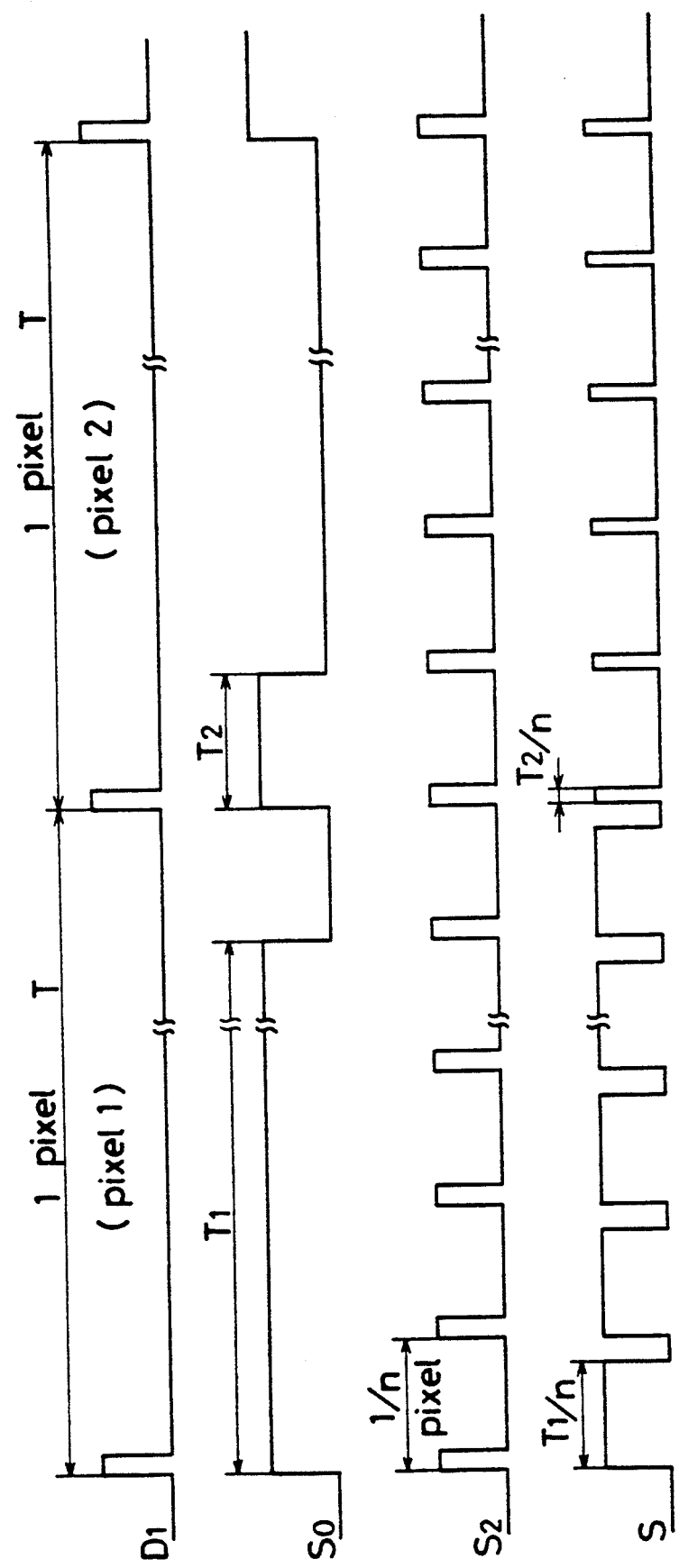
FIG. 8 is a timing chart for comparing this embodiment with a prior art embodiment.

On the other hand, the pixel process and laser timing controller 52 receives image data D1 from the host computer 50 via the process controller 51, and uses the PPS signal S2 and the GATE signal S1 transmitted from the servo controller 53 to produce a laser drive pulse signal S. The image data D1 is converted by a converting table 52e into data on-time data D2 which indicates a required laser drive period for making image density information carried by the data D1. On the other hand, the GATE signal S1 and the PPS signal S2 output from the servo controller 53 are transmitted to the laser on-timing controller 52a, and utilized as timing signals in driving laser. The laser on-time controller 52a produces a latch pulse signal P1 which synchronizes with a clock generated by a pixel clock generator 52b and latches the data D1 transmitted in synchronization with a PBS signal S3 indicating a boundary between pixels as the on-time data D2, and a load pulse signal P2 for loading the drive pulse generator 52c with the on-time data D2. The drive pulse generator 52c makes the laser drive pulse signal S effective in accord with an edge of the load pulse signal P2, at the same time loads a counter within it with the on-time data D2, and start a count operation in accord with a clock produced by the pixel clock generator 52b. When the on-time data D2 in the counter is completely counted, the laser drive pulse signal S is made invalid. Since the load pulse signal P2 is composed of the PPS signal S2 and the GATE signal S1, the laser drive pulse signal S is output 4 times per a single pixel. Then, the laser drive pulse signal S is transmitted to the laser driver 54, and causes the laser diode 2 to light up 4 times in even positions within a single pixel. Referring to FIG. 8, SO is a conventional laser drive pulse signal, and the laser drive pulse signal S in this embodiment is a signal which is produced equally dividing the pulse signal SO into N per a single pixel.

Thus, in this embodiment, energy of laser beam applied to pixels are dispersed without unevenness, and consequently, a good density gradation can be obtained.

According to the present invention, beam energy per a single pixel written in an optical image memory can be dispersed, and hence, as to an image density, a good gradation can be reproduced.

What is claimed is:

1. An image formation device in which an image according to image data received from image data output means is selectively written by a light beam in an optical image memory and the image is printed out on a recording medium, comprising
   a light source for emitting a light beam,
   scanning means for scanning a surface of the optical image memory with the light beam,
   switch means for turning the light beam on or off,
   sensing means for sensing from the image data a beam irradiating period T corresponding to a density per pixel, and
   control means for controlling the switch means so that the light beam intermittently performs a T/n period irradiation n times during a scanning period per pixel to be distributed over n different portions of the pixel in the scanning direction, where $n \geq 2$.

2. A device according to claim 1, further comprising signal output means for outputting a clock signal each time the light beam scans 1/n of the scanning period per pixel, and
   the control means controls the switch means so that the light beam irradiates the optical image memory for the period T/n each time the detecting means outputs the clock signal.

3. A device according to claim 2, wherein the scanning means is driven by a motor, and the signal output means is a rotary encoder which is coupled with the motor.

4. a device according to claim 1, wherein the light source is a laser diode, and the optical image memory is a liquid crystal cell.

* * * * *